(12) United States Patent
Pohl et al.

(10) Patent No.: US 11,960,611 B2
(45) Date of Patent: Apr. 16, 2024

(54) EFFICIENT DISTRIBUTION OF PROCESSES BETWEEN A VEHICLE CONTROL COMPUTING DEVICE AND A CRYPTOGRAPHIC MODULE, AND METHOD FOR OPERATION THEREOF

(71) Applicant: Robert Bosch GmbH, Stuttgart (DE)

(72) Inventors: Christopher Pohl, Duesseldorf (DE); Frederic Stumpf, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 372 days.

(21) Appl. No.: 17/312,600

(22) PCT Filed: Nov. 27, 2019

(86) PCT No.: PCT/EP2019/082704
§ 371 (c)(1),
(2) Date: Jun. 10, 2021

(87) PCT Pub. No.: WO2020/126365
PCT Pub. Date: Jun. 25, 2020

(65) Prior Publication Data
US 2022/0043918 A1 Feb. 10, 2022

(30) Foreign Application Priority Data
Dec. 17, 2018 (DE) .......................... 102018221954.0

(51) Int. Cl.
*G06F 21/00* (2013.01)
*G06F 21/60* (2013.01)
*H04L 9/32* (2006.01)

(52) U.S. Cl.
CPC .......... *G06F 21/602* (2013.01); *H04L 9/3242* (2013.01); *H04L 2209/84* (2013.01)

(58) Field of Classification Search
None
See application file for complete search history.

(56) References Cited

U.S. PATENT DOCUMENTS 7,712,139 B2 * 5/2010 Westendorf ............... H04L 1/18
713/176
8,316,235 B2 * 11/2012 Boehl ................... H04L 9/0662
713/168
(Continued)

FOREIGN PATENT DOCUMENTS

CN 101529937 A 9/2009
CN 104101376 A 10/2014
(Continued)

OTHER PUBLICATIONS

International Search Report for PCT/EP2019/082704, dated Jan. 29, 2020.
(Continued)

*Primary Examiner* — Jeffery L Williams
(74) *Attorney, Agent, or Firm* — NORTON ROSE FULBRIGHT US LLP; Gerard A. Messina

(57) ABSTRACT

A computing device, in particular, for a control unit of a motor vehicle. The computing device is configured to receive messages from at least one external unit. The computing device is configured to store the received messages at least temporarily and to transmit a plurality of the received messages to a cryptographic module, which is configured to execute a check of the transmitted messages.

15 Claims, 2 Drawing Sheets

(56) References Cited

U.S. PATENT DOCUMENTS

| | | | |
|---|---|---|---|
| 9,904,531 B2* | 2/2018 | Suzuki | G06F 8/65 |
| 9,935,774 B2* | 4/2018 | Sharma | H04L 9/3242 |
| 11,702,424 B2* | 7/2023 | Trzupek | C07D 207/273 |
| | | | 514/210.18 |
| 2002/0042878 A1* | 4/2002 | Westendorf | H04L 9/3247 |
| | | | 713/169 |
| 2008/0256320 A1* | 10/2008 | Hartwich | H04L 49/90 |
| | | | 711/E12.015 |
| 2008/0282041 A1* | 11/2008 | Hartwich | H04L 49/9089 |
| | | | 711/147 |
| 2014/0301550 A1* | 10/2014 | Lewis | H04L 9/0822 |
| | | | 380/259 |
| 2014/0304511 A1* | 10/2014 | Lewis | H04L 9/0637 |
| | | | 713/170 |
| 2015/0113521 A1* | 4/2015 | Suzuki | G06F 8/65 |
| | | | 717/173 |
| 2015/0270954 A1* | 9/2015 | Gross | H04L 9/0618 |
| | | | 380/28 |
| 2016/0344552 A1* | 11/2016 | Sharma | G06F 21/602 |
| 2016/0344705 A1* | 11/2016 | Stumpf | H04L 9/3213 |
| 2018/0083785 A1* | 3/2018 | Shields | H04L 9/14 |
| 2018/0131522 A1* | 5/2018 | Lawlis | H04L 9/0631 |
| 2018/0302422 A1* | 10/2018 | Kishikawa | H04L 9/3271 |
| 2022/0043918 A1* | 2/2022 | Pohl | H04L 63/123 |
| 2022/0255994 A1* | 8/2022 | Nishikawa | H04L 12/40202 |
| 2023/0239693 A1* | 7/2023 | Wang | H04L 9/3242 |
| | | | 726/6 |
| 2023/0239945 A1* | 7/2023 | Guilloux | H04L 1/1642 |
| | | | 370/329 |

FOREIGN PATENT DOCUMENTS

| | | |
|---|---|---|
| CN | 107040368 A | 8/2017 |
| CN | 108292993 A | 7/2018 |
| CN | 108496322 A | 9/2018 |
| DE | 102013206202 A1 | 10/2014 |
| DE | 102015104167 A1 | 9/2015 |
| DE | 102017125826 A1 | 5/2018 |
| JP | 2006146837 A | 6/2006 |
| JP | 2009005738 A | 1/2009 |
| JP | 2009065294 A | 3/2009 |
| JP | 2018511248 A | 4/2018 |
| JP | 2018133743 A | 8/2018 |

OTHER PUBLICATIONS

Dworkin, "Recommendation for Block Cipher Modes of Operation: the CMAC Mode for Authentication," NIST Special Publication 800-38B, 2005, pp. 1-21. https://doi.org/10.6028%2Fnist.sp.800-38b Downloaded Jun. 10, 2021.

* cited by examiner

EFFICIENT DISTRIBUTION OF PROCESSES BETWEEN A VEHICLE CONTROL COMPUTING DEVICE AND A CRYPTOGRAPHIC MODULE, AND METHOD FOR OPERATION THEREOF

FIELD

The present invention relates to a computing device, in particular, for a control unit of a motor vehicle; the computing device being configured to receive messages from at least one external unit.

The present invention further relates to a method for operating such a computing device.

SUMMARY

Preferred specific embodiments of the present invention relate to a computing device, in particular, for a control unit of a motor vehicle; the computing device being configured to receive messages from at least one external unit, for example, from further control units; the computing device being configured to store the received messages at least temporarily and to transmit a plurality of the received messages to a cryptographic module, which is configured to execute a check of the transmitted messages. This allows the plurality of transmitted messages may be checked in an efficient manner.

In further preferred specific embodiments of the present invention, the computing device is configured to receive a result of the check from the cryptographic module and to process at least one of the plurality of received messages as a function of the result of the check.

In further preferred specific embodiments of the present invention, the computing device is configured to wait for a specifiable minimum number of received messages, before the plurality of received messages are transmitted to the cryptographic module.

In further preferred specific embodiments of the present invention, the computing device is configured to wait for a specifiable period of time, before the plurality of messages received, in particular, during the specifiable period of time, are transmitted to the cryptographic module.

In further preferred specific embodiments of the present invention, the at least temporary storage of received messages includes at least temporary storage of the received messages in a storage device, which both the computing device and the cryptographic module may access; the transmission including the following steps: transferring first control information items, which characterize a storage area of the storage device, in which the received messages are stored.

In further preferred specific embodiments of the present invention, the first control information items include at least a pointer and/or a number of received messages.

In further preferred specific embodiments of the present invention, the computing device is configured to transfer second control information items to the cryptographic module; the second control information items characterizing a storage area and/or an address in the storage device, in which storage area and/or at which address the cryptographic module should write a/the result of the check.

In further preferred specific embodiments of the present invention, the computing device is configured not to carry out processing of a received message, if the received message has not already been checked by the cryptographic module. This ensures that only messages checked by the cryptographic module are processed.

In further preferred specific embodiments of the present invention, the cryptographic module is integrated in the computing device, and/or the cryptographic module is situated on the same semiconductor substrate as the computing device, which yields a particularly compact configuration.

In further preferred variants of the present invention, as an alternative to, or in addition to, the messages N to be received from an external unit, the computing device may generally receive and/or ascertain data and/or messages from other sources (for example, even data and/or messages formed by the computing device, as well), and optionally process them or have them processed (in particular, by the cryptographic module), using a cryptographic method, e.g., provide them with a cryptographic signature. To this end, in further preferred specific embodiments, the computing device may transmit the above-mentioned messages (obtained from other sources or formed by itself), preferably, in turn, a plurality of the above-mentioned messages, to the cryptographic module; in further preferred specific embodiments, (e.g., in place of the check described above) the cryptographic module providing these messages with the cryptographic signature, preferably, providing all of the above-mentioned plurality of messages with the signature initially, and, in further preferred specific embodiments, then transmitting the messages provided with the signature to the computing device, which, in further preferred specific embodiments, then transmits the signed messages, for example, to further computing devices and/or control units.

Further preferred specific embodiments of the present invention relate to a method of operating a computing device, in particular, for a control unit of a motor vehicle. In accordance with an example embodiment of the present invention, the computing device receives messages from at least one external unit; the computing device storing the received messages at least temporarily and transmitting a plurality of the received messages to a cryptographic module, which is configured to execute a check of the transmitted messages.

Further preferred specific embodiments of the present invention relate to a cryptographic module for a computing device, in particular, for a computing device according to the specific embodiments; the cryptographic module being configured to receive a plurality of messages from the computing device and to execute a check of the received messages.

In further preferred specific embodiments of the present invention, the check is carried out, using a cipher-based message authentication code, CMAC. This allows particularly efficient checking. An Internet publication, which relates to an exemplary embodiment of the CMAC method, may be found, for example, at https://doi.org/10.6028%2Fnist.sp.800-38b.

In further preferred specific embodiments of the present invention, the cryptographic module is configured to transmit a result of the check to the computing device; the transmission including, in particular, the writing of result information items characterizing the result to a specifiable storage area of a storage device, which may be accessed by both the computing device and the cryptographic module.

Further preferred specific embodiments of the present invention relate to use of the computing device according to the specific embodiments and/or of the method according to the specific embodiments and/or of the cryptographic module according to the specific embodiments, for processing messages, in particular, messages transmitted via a bus system of a vehicle, in particular, a motor vehicle.

Additional features, uses and advantages of the present invention are derived from the following description of exemplary embodiments of the present invention, which are represented in the figures. In this context, all of the described or illustrated features form the subject matter of the present invention, either alone or in any combination, irrespective of their wording and representation in the description and in the figures, respectively.

DETAILED DESCRIPTION OF EXAMPLE EMBODIMENTS

Figure 1:
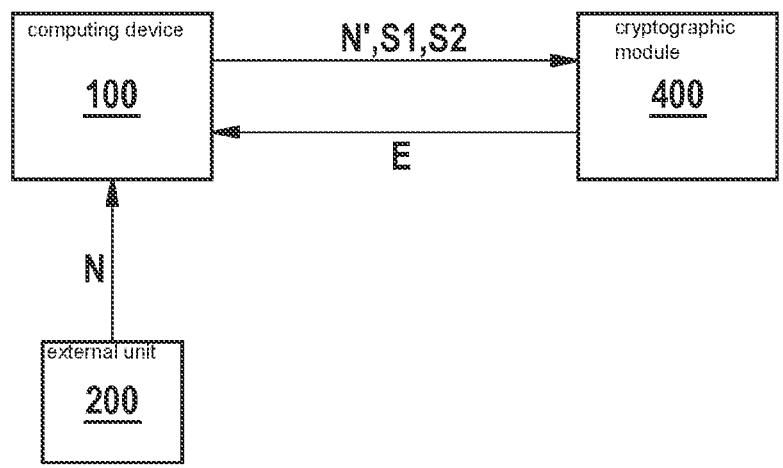
FIG. 1 shows a schematic, simplified block diagram of a computing device according to preferred specific embodiments of the present invention.

FIG. 1 shows a schematic, simplified block diagram of a computing device 100 according to preferred specific embodiments. Computing device 100 is configured to receive messages N (or, in general, any data) from at least one external unit 200, for example, a control unit, to store received messages N at least temporarily, and to transmit a plurality N' of received messages N to a cryptographic module 400, which is configured to execute a check of transmitted messages N'. In this manner, the plurality of transmitted messages N' may be checked efficiently, and the plurality N' of messages may be transmitted by computing device 100 to cryptographic module 400 in a particularly resource-conserving manner, e.g., as a cohesive block of data, in contrast to, for example, repeated transmission of individual messages.

Figure 2:
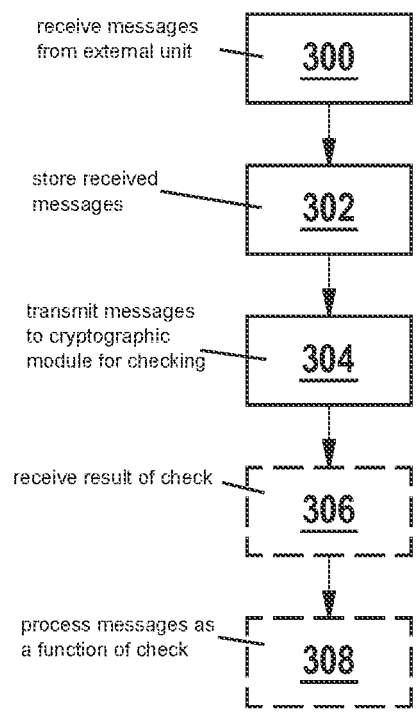
FIG. 2 shows a schematic, simplified flow chart of a method according to further preferred specific embodiments of the present invention.

FIG. 2 shows a schematic, simplified flow chart of a method according to further preferred specific embodiments. In step 300, device 100 (FIG. 1) receives messages N (or, in general, any data) from external unit 200 (or from a plurality of different units not shown). In step 302, computing device 100 stores received messages N at least temporarily. In step 304, computing device 100 transmits the plurality N' of received messages to cryptographic module 400 for checking.

In further preferred specific embodiments, computing device 100 is configured to receive a result E (FIG. 1) of the check from cryptographic module 400, cf. optional step 306 from FIG. 2, and to process at least one of the plurality of received messages N as a function of result E of the check, cf. optional step 308 from FIG. 2.

In further preferred specific embodiments of the present invention, after the transmission from step 304 and, in particular, prior to the reception of result E according to step 306, computing device 100 may execute further tasks, which means that the time frame, which cryptographic module 400 possibly needs for checking the messages to be checked that were ascertained beforehand, may be used by computing device 100 for a different purpose. For example, results communicated earlier by cryptographic module 400 and/or corresponding, received messages may be processed by computing device 100 in the above-mentioned time frame.

Figure 3:
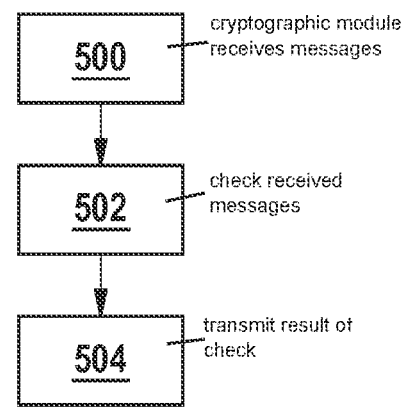
FIG. 3 shows a schematic, simplified flow chart of a method according to further preferred specific embodiments of the present invention.

FIG. 3 shows a schematic, simplified flow chart of a method according to further preferred specific embodiments, which describes the processing of messages by cryptographic module 400. In step 500, cryptographic module 400 receives the plurality N' of messages, which have been transmitted by computing device 100 to cryptographic module 400 in step 304. In step 502, cryptographic module 400 executes a check of the messages received from computing device 100. In further preferred specific embodiments, the check according to step 502 of FIG. 3 is executed, using a cipher-based message authentication code, CMAC. For example, a CMAC reference value, which cryptographic module 400 may access, may be provided for a relevant message to be checked. For checking step 502, using a CMAC method, cryptographic module 400 may advantageously calculate a current CMAC value as a function of the received message to be checked and may compare it to the CMAC reference value. If the comparison reveals that the values compared to each other are equal, cryptographic module 400 may infer that the checked message is genuine and provide a corresponding result E of the check. If the compared values do not agree with each other, it may be inferred that the message currently received and checked is not proper, for example, has been manipulated (and/or corrupted unintentionally).

In further preferred specific embodiments of the present invention, one or more reference values for the check 502, in particular, one or more CMAC reference values for messages to be checked by cryptographic module 400, may be supplied to cryptographic module 400 by computing device 100. For example, together with the plurality N' of messages to be checked, computing device 100 may transmit the reference values and/or CMAC reference values to cryptographic module 400.

In further preferred specific embodiments of the present invention, for example, the following data format may be used for this. A message to be checked (plaintext) is assigned an index value, which enables unequivocal identification of the message within the plurality N' of the messages to be checked. The message to be checked is optionally assigned a (CMAC) reference value. As a further option, the message to be checked is assigned a key information item (key ID), which characterizes a specific cryptographic cipher key that is associated with the message to be checked. Accordingly, in further preferred specific embodiments, a data record of the data format described above by way of example may include at least one of the following elements: a) index value; b) contents of the message (plaintext); c) (CMAC) reference value; d) key information item (key ID). In further preferred specific embodiments, in transmission step 304

(FIG. 2), in addition to the message to be checked in accordance with further preferred specific embodiments, one or more of the above-mentioned elements a), c), d) of the data format described by way of example may also be transmitted to cryptographic module 400; the above-mentioned plurality M' of messages, that is, a corresponding plurality of the above-mentioned data records, which corresponds to the above-mentioned plurality M' of messages, being advantageously transmitted, in turn, to cryptographic module 400.

In step 504 according to FIG. 3, cryptographic module 400 transmits result E (FIG. 1) of check 502 (FIG. 3) to computing device 100; computing device 100 being able to continue with the method already described above with reference to FIG. 2, as a function of result E, using optional steps 306 and/or 308.

In further preferred specific embodiments of the present invention, additional advantages are produced by the transmission 302 (FIG. 2) of the plurality N' of messages from computing device 100 to cryptographic module 400, since cryptographic module 400 may also check a plurality of transmitted messages at a time, in particular, without communicating further with computing device 100 in this connection (or interrupting the check of the plurality N' of messages for communication with computing device 100), for example, to reload further, individual messages to be checked. On the contrary, the above-mentioned plurality N' of messages may initially be checked inside of cryptographic module 400 in the manner described, cf. step 502 according to FIG. 3, and result E is only communicated to computing device 100 after a complete check of the mentioned plurality N'.

Figure 4:
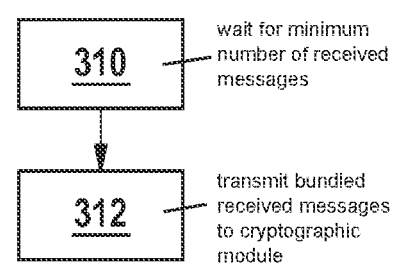
FIG. 4 shows a schematic, simplified flow chart of a method according to further preferred specific embodiments of the present invention.

In further preferred specific embodiments of the present invention, cf. the simplified flow chart from FIG. 4, computing device 100 is configured to wait for a specifiable minimum number of received messages, cf. step 310, before the plurality N' (FIG. 1) of received messages are transmitted to cryptographic module 400, cf. step 312. In this manner, a plurality of received messages may advantageously be bundled by computing device 100 and transmitted to cryptographic module 400 in one transmission event.

Figure 5A:
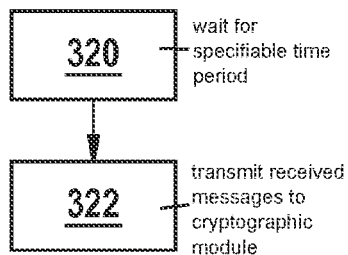
FIGS. 5A, 5B show, in each instance, a schematic, simplified flow chart of a method according to further preferred specific embodiments of the present invention.

In further preferred specific embodiments of the present invention, cf. the simplified flow chart from FIG. 5A, computing device 100 is configured to wait for a specifiable period of time, cf. step 320, until the plurality N' of messages received, in particular, during the specifiable period of time, are transmitted to cryptographic module 400, cf. step 322. In this manner, a plurality of messages N arriving at computing device 100 from the at least one further unit 200 may advantageously be bundled, as well, before these are transmitted in the form of plurality N' to cryptographic module 400 for the purpose of checking.

Figure 5B:
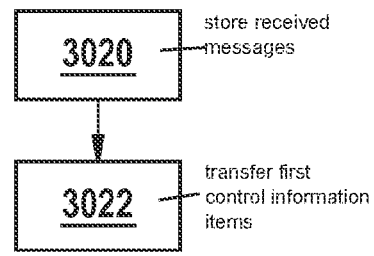

In further preferred specific embodiments of the present invention, cf. the simplified flow chart according to FIG. 5B, the at least temporary storage of received messages by computing device 100 includes at least temporary storage 3020 of the received messages in a storage device, which both computing device 100 and cryptographic module 400 may access; the transmission 3022 including the following steps: transferring first control information items S1 (FIG. 1); the first control information items characterizing a storage area of the storage device, in which the received messages are stored. For example, first control information items S1 may include at least a pointer to a corresponding storage area of the storage device.

In further preferred specific embodiments of the present invention, in this manner, in addition to the transmission of the plurality M' of the messages to be checked, one or more of the elements a) index value, c) (CMAC) reference value, d) key information item (key ID) associated with the respective message may additionally be transmitted to cryptographic module 400 in an efficient manner, as well.

Figure 6:
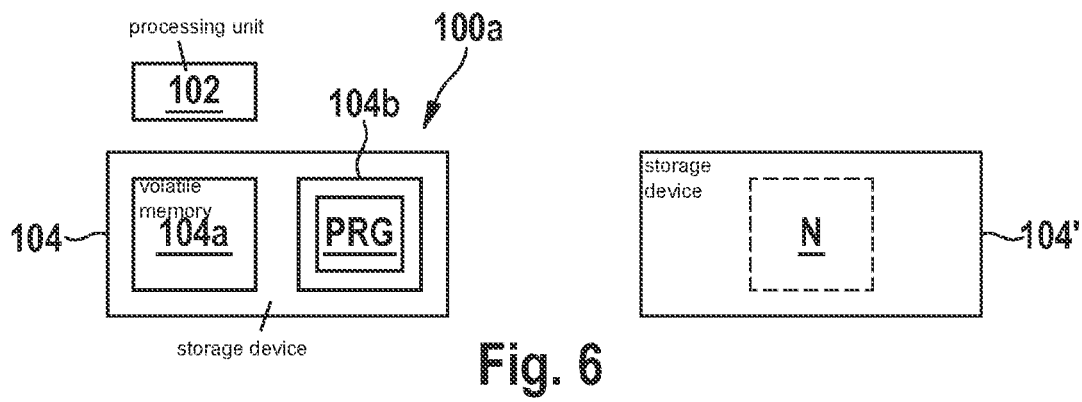
FIG. 6 shows a schematic, simplified block diagram of a computing device according to further preferred specific embodiments of the present invention.

FIG. 6 shows a schematic, simplified block diagram according to further preferred specific embodiments of the present invention. For example, computing device 100 from FIG. 1 may have the configuration 100a according to FIG. 6. Configuration 100a includes at least one processing unit 102 and at least one storage device 104 assigned to processing unit 102, for storing a computer program PRG at least temporarily; computer program PRG being configured, in particular, to control the operation of computing device 100 and/or configuration 100a, in particular, for executing the method according to the specific embodiments.

In further preferred specific embodiments of the present invention, processing unit 102 includes at least one of the following elements: a microprocessor, a microcontroller, a digital signal processor (DSP), a programmable logic unit (e.g., field-programmable gate array, FPGA), an ASIC (application-specific integrated circuit), a hardware circuit. Combinations of these are also conceivable in further preferred specific embodiments.

In further preferred specific embodiments of the present invention, storage device 104 includes at least one of the following elements: a volatile memory 104a, in particular, working memory (RAM), a nonvolatile memory 104b, in particular, flash-EEPROM. Computer program PRG is preferably stored in nonvolatile memory 104b.

In further preferred specific embodiments of the present invention, the storage device 104', which is already described above, and which both computing device 100, 100a and cryptographic module 400 may access, is also provided. As already described, as well, in further preferred specific embodiments, messages N received from computing device 100, 100a may be stored at least temporarily in storage device 104'. For this, in further preferred specific embodiments, at least one receive buffer may be defined for messages to be received.

In further preferred specific embodiments of the present invention, storage device 104' may also form a part of storage device 104 and/or be integrated into it. In this manner, messages N may be transmitted from computing device 100 to cryptographic module 400 in a particularly efficient manner. For example, in further preferred specific embodiments, the transmission of first control information items S1 from computing device 100 to cryptographic module 400 may be sufficient, in order for cryptographic module 400 to be able to read and/or load messages to be checked from storage device 104'.

In further preferred specific embodiments of the present invention, first control information items S1 include at least a pointer (for example, to a storage area of storage device 104' containing the messages N to be checked), and/or a number of received messages.

In further preferred specific embodiments of the present invention, computing device 100, 100a is configured to transfer second control information items S2 (FIG. 1) to cryptographic module 400; second control information items S2 characterizing a storage area and/or an address in storage device 104', in which storage area and/or at which address cryptographic module 400 should write a/the result E (FIG. 1) of the check 502 (FIG. 3).

In further preferred specific embodiments of the present invention, computing device 100, 100a is configured not to carry out processing of a received message N, if the received message has not already been checked by cryptographic module 400. This ensures that only messages checked by cryptographic module 400 are processed.

Figure 7:
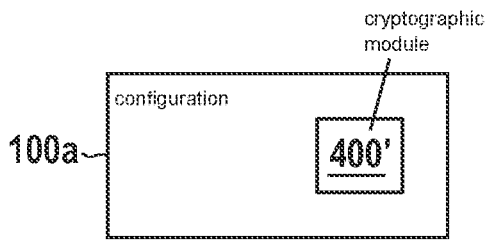
FIG. 7 shows a schematic, simplified block diagram of a computing device according to further preferred specific embodiments of the present invention.

In further preferred specific embodiments of the present invention, cf. the simplified block diagram according to FIG. 7, cryptographic module 400' is integrated in computing device 100a.

Figure 8:
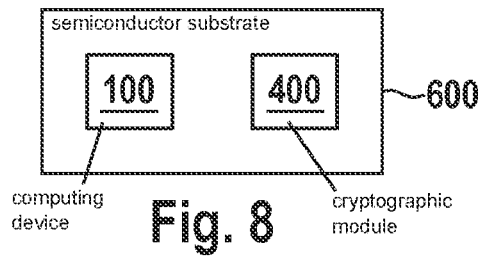
FIG. 8 shows a schematic, simplified block diagram of a semiconductor substrate according to further preferred specific embodiments of the present invention.

In further preferred specific embodiments of the present invention, cf. the simplified block diagram according to FIG. 8, cryptographic module 400 is situated on the same semiconductor substrate 600 as computing device 100, which yields a particularly compact configuration.

In further preferred specific embodiments of the present invention, cryptographic module 400, 400' is configured to transmit a result E of the check 502 (FIG. 3) to computing device 100, 100a; the transmission including, in particular, the writing of result information items characterizing result E to a specifiable storage area of storage device 104' (FIG. 6), which both computing device 100, 100a and cryptographic module 400, 400' may access. In further preferred specific embodiments, different result values of result E, which are assigned to the different messages of plurality M', are supplemented, for example, by the index value already described above, in order to render possible an unequivocal assignment of the specific result value to a corresponding, checked message.

Further preferred specific embodiments of the present invention relate to use of computing device 100, 100a according to the specific embodiments and/or of the method according to the specific embodiments and/or of cryptographic module 400, 400' according to the specific embodiments, for processing messages N (or, in general, any data), in particular, messages transmitted via a bus system of a vehicle, in particular, a motor vehicle.

Figure 9:
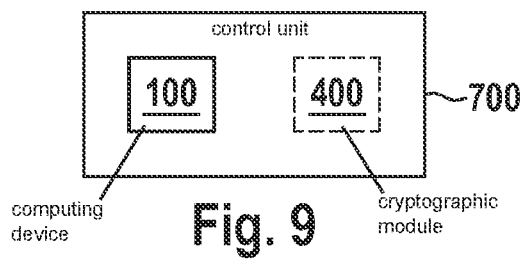
FIG. 9 shows a schematic, simplified block diagram of a control unit according to further preferred specific embodiments of the present invention.

In further preferred specific embodiments of the present invention, cf. the schematic block diagram according to FIG. 9, computing device 100 is part of a control unit 700, in particular, for a motor vehicle; cryptographic module 400 optionally being able to form a part of control unit 700, as well.

In further preferred variants of the present invention, as an alternative to, or in addition to, the messages N to be received from external unit 200, computing device 100 may generally receive and/or ascertain data and/or messages from other sources (for example, even data and/or messages formed by computing device 100, as well) and optionally process them, using a cryptographic method, for example, provide them with a cryptographic signature. To this end, in further preferred specific embodiments, in a manner comparable to the operation described above with reference to FIG. 2, computing device 100 may transmit the above-mentioned messages (e.g., formed by itself), preferably, in turn, a plurality of the above-mentioned messages, to cryptographic module 400; in place of the check 502 described above with reference to FIG. 3, cryptographic module 400 providing these messages with the cryptographic signature, preferably, providing all of the above-mentioned plurality of messages initially with the signature, and then transmitting the messages provided with the signature to computing device 100, which, in further preferred specific embodiments, may then transmit the signed messages, for example, to further computing devices and/or control units. In further preferred specific embodiments, the storage device 104', which is described above with reference to FIG. 6 and may be accessed by computing device 100 and cryptographic module 400, may also be used for this generation and supplementing of the signature and the corresponding exchange of data between the two devices 100, 400. In other words, in further preferred specific embodiments, for the generation of signatures, as well, cryptographic module 400 may carry out a corresponding exchange of data with computing device 100 in a pointer-based manner, in that computing device 100 exchanges, with cryptographic module 400, corresponding pointers to responsive storage areas of the jointly usable storage device 104'; these storage areas containing, for example, the messages to be provided with the signature and/or the messages provided with the signature.

The features according to the specific embodiments allow particularly efficient processing of messages N by computing device 100, 100a. This relates to the processing of both messages, which are received in computing device 100, 100a from external unit 200, and messages, which are intended to be formed and/or signed in computing device 100. The specific transmission of a plurality N' of messages to cryptographic module 400 and/or processing of the plurality N' of messages by cryptographic module 400 saves, in particular, computing resources of computing device 100, 100a and prevents communications overhead, which occurs in conventional systems, and in which messages to be checked are processed individually by the computing device and/or may be transmitted individually to a cryptographic module 400.

In addition, the use of the features according to the specific embodiments minimizes transmission events from computing device 100, 100a to cryptographic module 400, in particular, regarding information critical with regard to safety, which means that the level of security is increased further.

In further preferred specific embodiments of the present invention, a value of the plurality N' of messages may be selected and/or parameterized in the same manner as the specifiable minimum number of received messages, which are waited for (cf. step 310 from FIG. 4) and/or the specifiable period of time according to step 320 from FIG. 5A. This allows the principle according to the specific embodiments to be adapted efficiently to different target systems, such as control units; it being possible, in particular, to take into account the communications load of the respective control units (number of messages to process per unit time) and/or the computing resources and/or memory resources. Furthermore, the principle according to the specific embodiments provides increased flexibility with regard to configurability of the processing of messages N by computing device 100, 100a.

What is claimed is:

1. A computing device for control of a motor vehicle comprising:
   at least one processor, wherein the at least one processor is configured to:
      receive from at least one external unit (a) first messages for processing for the motor vehicle control and (b) subsequent to the receipt of the first messages, second messages for processing for the motor vehicle control;
      provide the first messages to a cryptographic module;
      while the at least one processor performs the processing of the first messages after the cryptographic module has provided a result an authentication procedure executed for the first messages that had been provided to the cryptographic module, store individual respective ones of the second messages at least temporarily into a memory, message by message, as the individual respective ones of the second messages are received by the at least one processor without providing any of the individual respective ones of the received second messages to the cryptographic module; and after the storing of all of the received second messages and responsive to (a) expiration of a predefined time period during which the receipt of the second messages occurred or (b) a number of the received second messages reaching a predefined threshold number, provide all of the stored second messages to the cryptographic module, which is configured to execute the authentication procedure respectively for each of the second messages individually, the respective authentication procedure including (a) a respective check of whether the respective individual one of the second messages provided to the cryptographic module is authentic or (b) a respective assignment of a respective cryptographic signature to the respective individual one of the second messages.

2. The computing device as recited in claim 1, wherein the authentication procedure includes the check, and the at least one processor is configured to perform the processing of the second messages in response to a result of the check received from the cryptographic module being that the second messages authentic.

3. The computing device as recited in claim 1, wherein the provision of the second messages to the cryptographic module is performed responsive to the number of the received second messages reaching the predefined threshold number.

4. The computing device as recited in claim 1, wherein the provision of the second messages to the cryptographic module is performed responsive to the expiration of the predefined time period.

5. The computing device as recited in claim 1, wherein the memory is a storage device that is accessible to both the computing device and the cryptographic module, and wherein the provision of the second messages to the cryptographic module includes transferring first control information items that characterize a storage area of the storage device in which the received second messages are stored for retrieval by the cryptographic module.

6. The computing device as recited in claim 5, wherein the first control information items include, for each one of the received second messages, at least a respective pointer and/or a respective index number of the respective received second message.

7. The computing device as recited in claim 1, wherein the at least one processor is configured to transfer to the cryptographic module control information items that characterize a storage area and/or an address in a storage device, in which storage area and/or at which address the cryptographic module should write results of the check or the cryptographic signatures.

8. The computing device as recited in claim 1, wherein, for each of the received messages, the at least one processor is configured to delay the processing of the respective message until after the cryptographic module completes the authentication procedure for the respective message.

9. The computing device as recited in claim 1, wherein the cryptographic module is integrated in the computing device, and/or the cryptographic module is situated on the same semiconductor substrate as the at least one processor.

10. A method of a computing device for control of a motor vehicle, the method comprising:

receiving, by at least one processor of the computing device and from at least one external unit, (a) first messages for processing for the motor vehicle control and (b) subsequent to the receipt of the first messages, second messages for processing for the motor vehicle control;

while the at least one processor performs the processing of the first messages after the cryptographic module has provided a result an authentication procedure executed for the first messages that had been provided to the cryptographic module, storing, by the computing device, individual respective ones of the received second messages at least temporarily into a memory, message by message, as the individual respective ones of the second messages are received by the at least one processor without providing any of the individual respective ones of the received second messages to the cryptographic module; and after the storing of all of the received second messages and responsive to (a) expiration of a predefined time period during which the receipt of the second messages occurred or (b) a number of the received second messages reaching a predefined threshold number, providing, by the at least one processor, all of the stored second messages to the cryptographic module, which is configured to execute the authentication procedure respectively for each of the second messages individually, the respective authentication procedure including (a) a respective check of whether the respective individual one of the second messages provided to the cryptographic module is authentic or (b) a respective assignment of a respective cryptographic signature to the respective individual one of the second messages.

11. A cryptographic module for a computing device for control of a motor vehicle, the cryptographic module configured to:

while at least one processor of the computing device performs processing of a plurality of first messages received by the at least one processor from at least one external unit for the motor vehicle control, receive, as a single message block, a plurality of second messages from the computing device that were previously received individually by the computing device from at least one external unit, wherein the receipt as the single message block is due to a delay by the at least one processor to provide the second messages until (a) expiration of a predefined time period during which the receipt of the second messages by the computing device occurred or (b) a number of the second messages received by the computing device reaches a predefined threshold number;

execute an authentication procedure respectively for each of the second messages individually, the respective authentication procedure including (a) a respective check of whether the respective individual one of the second messages received by the cryptographic module is authentic or (b) a respective assignment of a respective cryptographic signature to the respective individual one of the second messages; and provide results of the authentication procedure to the computing device, the at least one processor of which is configured to delay the processing of any respective one of the second messages for the motor vehicle control until after a respective one of the results of the authentication procedure corresponding to the respective one of the second messages is received by the computing device from the cryptographic module.

12. The cryptographic module as recited in claim 11, wherein the check is carried out using a cipher-based message authentication code (CMAC).

13. The cryptographic module as recited in claim 11, wherein the provision of the results is performed by writing result information items characterizing the results to a specifiable storage area of a storage device that is accessible by both the computing device and the cryptographic module.

14. The computing device as recited in claim 1, wherein the receipt of the messages from the external device is via a bus system of the motor vehicle.

15. The method as recited in claim 10, wherein the receipt of the messages from the external device is via a bus system of the motor vehicle.

\* \* \* \* \*